June 6, 1961
R. K. HOFFMAN ET AL
2,987,278
AIRCRAFT DECELERATING APPARATUS
Filed May 23, 1957
3 Sheets-Sheet 1
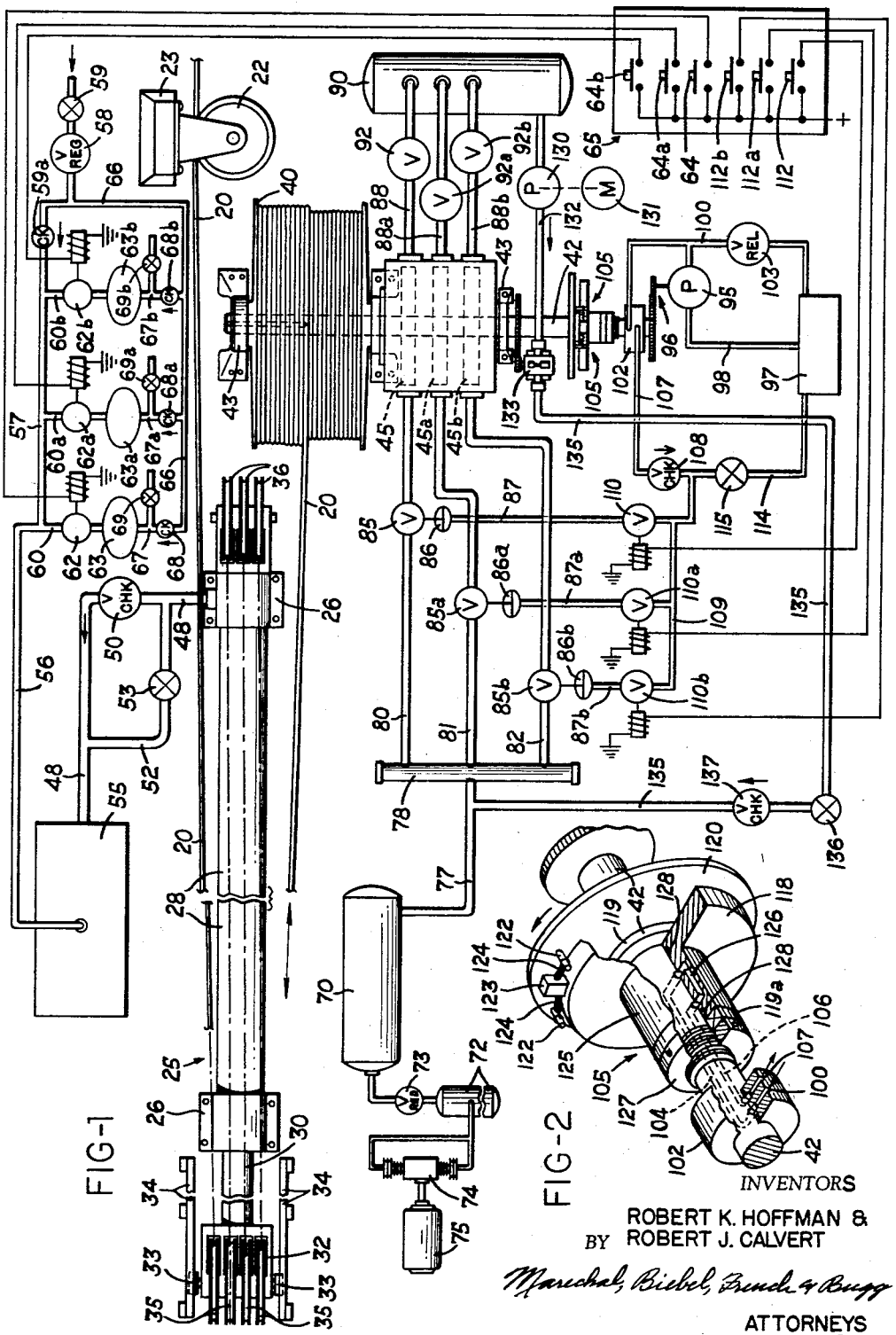
INVENTORS
ROBERT K. HOFFMAN &
BY ROBERT J. CALVERT
Marechal, Biebel, Frende & Bugg
ATTORNEYS

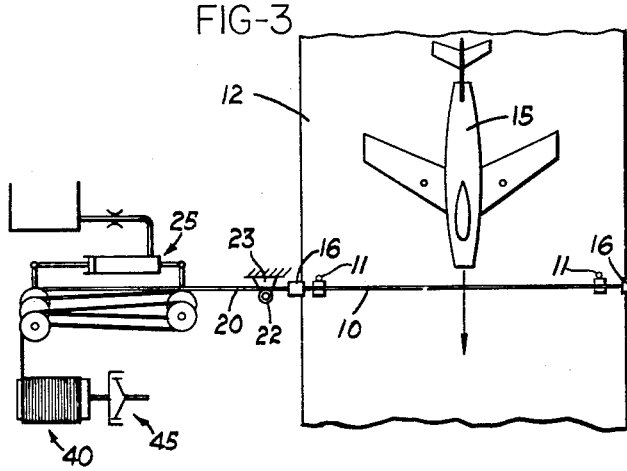
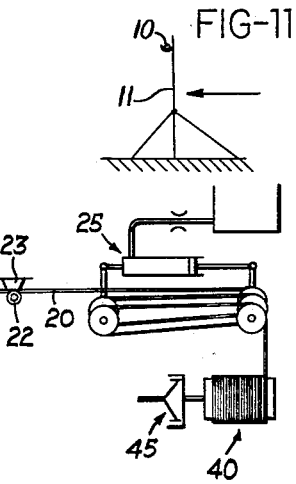
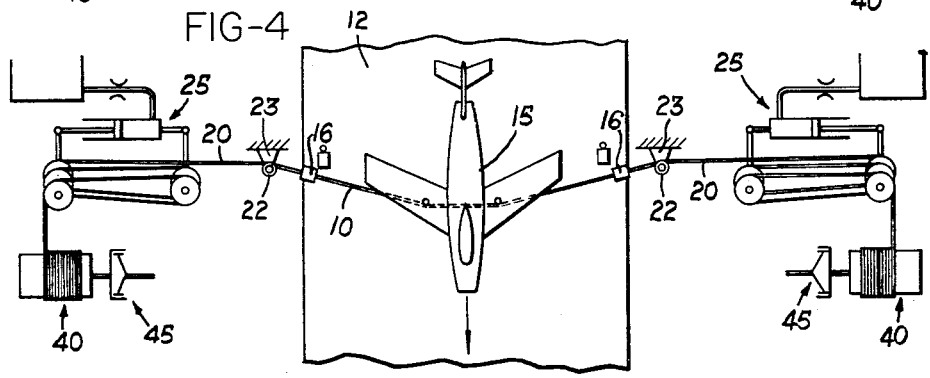
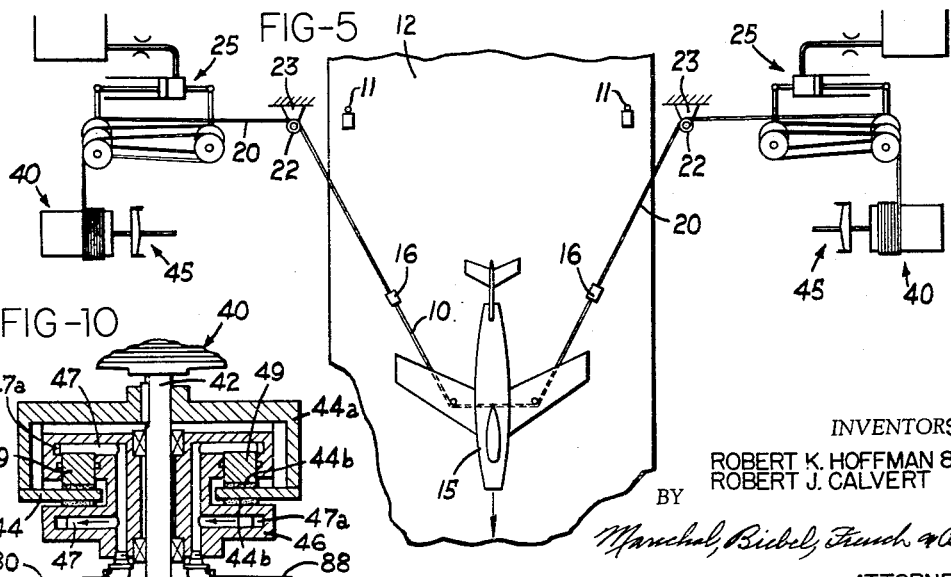
INVENTORS
ROBERT K. HOFFMAN &
ROBERT J. CALVERT
ATTORNEYS

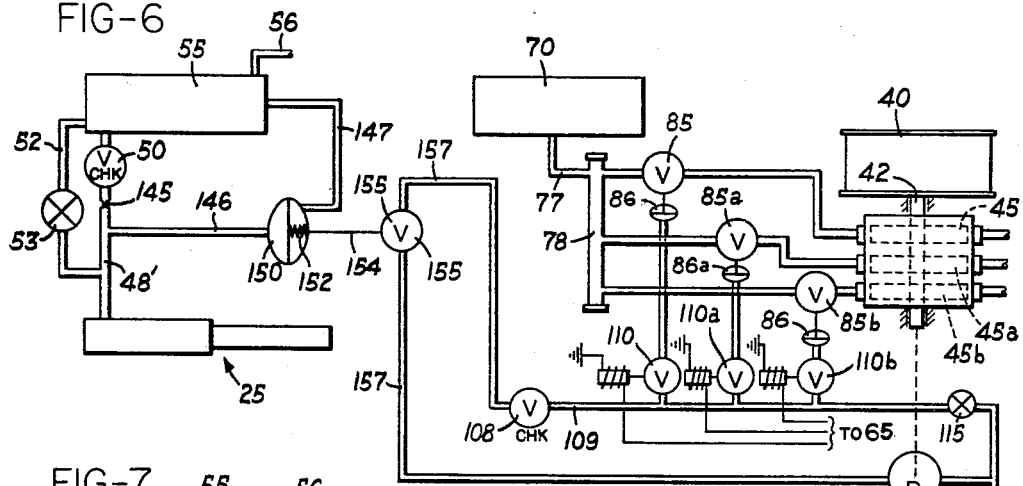
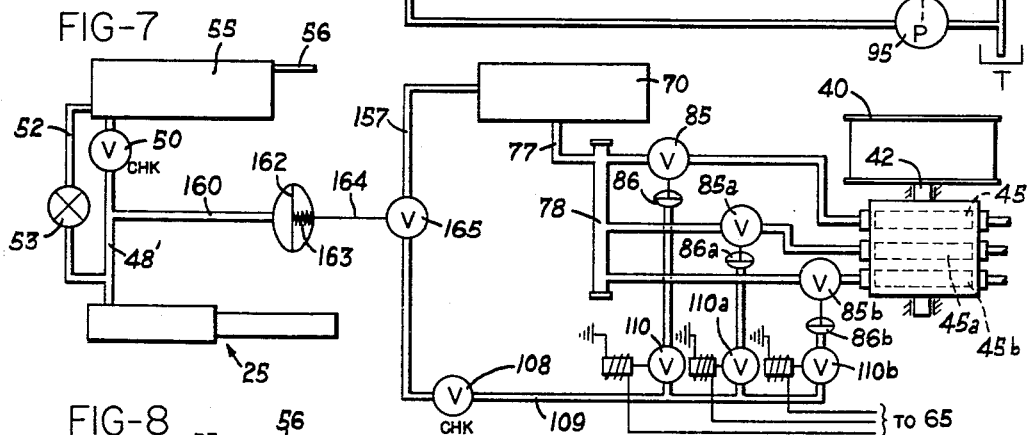
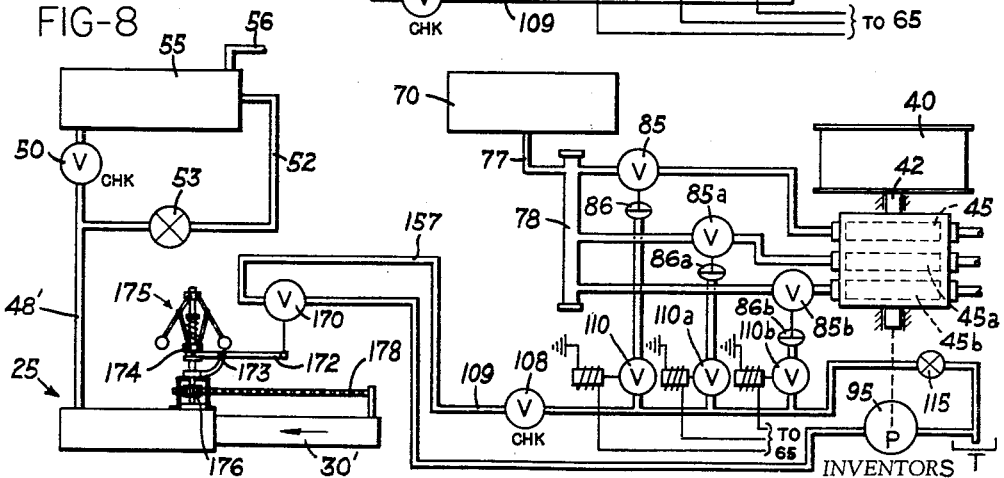
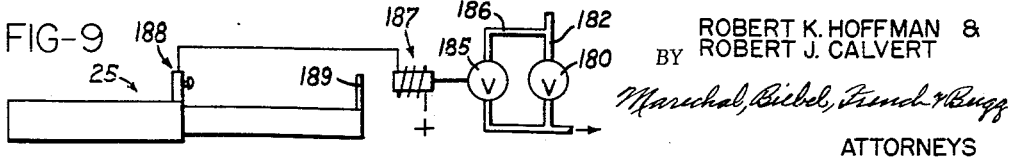

United States Patent Office 2,987,278
Patented June 6, 1961

2,987,278
AIRCRAFT DECELERATING APPARATUS
Robert K. Hoffman and Robert J. Calvert, Dayton, Ohio, assignors to Acme Precision Products, Inc., Dayton, Ohio, a corporation of Ohio
Filed May 23, 1957, Ser. No. 661,174
6 Claims. (Cl. 244—110)

This invention relates to apparatus for decelerating aircraft or the like moving on the ground along a defined path such as a runway.

Various types of aircraft arresting devices have been proposed heretofore, such as the arresting engines and associated mechanism in use on aircraft carriers. These devices, however, are generally limited in their application to use with certain types of aircraft having weights within a certain relatively small range and having engagement velocities also within a fairly well defined range. Furthermore, such aircraft are especially constructed and braced to withstand substantial forces of deceleration and and include special engaging means, such as a tail hook, for engaging the retarding or arresting system. In other words, these arresting systems actually encompass the arresting device itself and aircraft designed for use in conjunction with the arresting device.

The present invention provides energy absorbing apparatus for use over a wide range of engaging velocities and with a wide range of aircraft types, from small relatively light-weight private airplanes to very large and heavy commercial and bombardment type aircraft, and is especially suited to provide the large decelerating forces necessary to arrest heavy aircraft having relatively high landing and take off speeds. The present apparatus includes controls for varying the decelerating force which it exerts, and therefore it is adapted to retard many different types of aircraft efficiently without imposing excessive decelerating forces upon structure of the aircraft being arrested.

Basically, the present invention provides for aircraft arresting apparatus which includes a barrier or cable pickup device supported across the path of the moving aircraft, as across an airport runway. This engaging apparatus may take many different forms as desired, for example as shown in Patent 2,770,431, issued November 13, 1956, and may include a temporary barrier supported above the surface of the runway for engagement with aircraft undercarriage, or in the case of use with aircraft having engaging hooks or the like, the engaging means may be simply a cable supported above the runway surface for engagement by the hook. From the engaging apparatus cables extend on opposite sides of the runway and the other ends of these cables are normally coiled about one or more drums, each drum being provided with a brake for resisting rotation thereof particularly in the direction of rotation corresponding to uncoiling movement of the cable. This braking apparatus and drum provides the primary energy absorbing mechanism which exerts the main retarding force upon the engaged aircraft. Preferably the braking apparatus is so arranged that it may be applied progressively with variable force as necessary in a given arresting operation, and controls are provided for varying the braking force upon the drum as desired.

Immediately upon engagement of the aircraft with the barrier or other engaging means a large force is suddenly imposed upon such engaging means and is transmitted to the cable, and, of course a large force also is applied to the engaged parts of the aircraft, such as the landing gear. The retarding force imposed by the inertia of the drum or drums about which the cable is coiled in most instances is so extreme, particularly in the case of high velocity engagements, that the cable is likely to snap, or the aircraft be damaged considerably.

To guard against such an occurrence a second energy absorbing device is located in the connection between the cable and the drum, this second device being arranged to absorb some of the force of acceleration applied to the cable and also to pass on a certain portion of this force for the purpose of accelerating the drum prior to application of the main retarding force by the brake. This secondary energy absorbing device may take any different number of forms, but a preferable type of mechanism includes a normally expanded hydraulic ram and at least one sheave mounted on each of the relatively moving parts thereof, with the cable being reeved about these sheaves in passing to the drum. Thus there is at least one loop of predetermined length in the cable between the engaging device and the drum, and as the cable accelerates this loop will decrease in size, with the ram gradually collapsing and producing a retarding force against collapse of the loop while cable continues to pay out at a lower rate in that section of the cable between the sheaves and the drum.

This allows the drum to be accelerated at a lower and safe rate and precludes snapping of the cable by absorbing some of the accelerating forces thereon. The amount of arresting force supplied by the ram preferably is variable, as by imposing a back pressure upon the fluid passing from the ram as it collapses and regulating the back pressure within desired limits. Such regulation may be accomplished in any suitable manner, as by conducting the fluid from the ram into a closed receiver tank within which an atmosphere of variable pressure is maintained.

Accordingly, the primary object of this invention is to provide an improved type of energy absorbing apparatus for use in retarding the motion of aircraft moving on the ground along a known path.

Another object of this invention is to provide such energy absorbing apparatus including primary and secondary energy absorbing devices which are applied in sequential fashion to regulate the application of decelerating forces by the apparatus, and thus to protect both the apparatus itself and the engaged aircraft from excessive decelerating forces.

A further object of this invention is to provide aircraft motion arresting apparatus wherein the decelerating force and the rate of application of such force may be controlled in accordance with predetermined values applicable to a particular aircraft of known mass moving at a predetermined velocity at the time of its engagement with the arresting apparatus.

Another object of the invention is to provide such apparatus which may be economically manufactured and which occupies a minimum of space.

An additional object of the invention is to provide, in aircraft motion arresting apparatus as outlined above, mechanism and controls for resetting the arresting gear rapidly so that it may be quickly readied for consecutive arresting operations.

Other objects and advantages of the invention will be apparent from the following description, the accompanying drawings and the appended claims.

In the drawings—

FIG. 1 is a diagrammatic illustration of energy absorbing apparatus for use in an arresting system in accordance with the invention;

FIG. 2 shows typical acceleration responsive mechanism which may be employed to control a valve in the apparatus of FIG. 1;

FIGS. 3, 4 and 5 are diagrammatic illustrations showing the sequential operation of an arresting system in accordance with the invention;

FIG. 6 is a diagram of a modified control for the arresting system of FIG. 1;

FIGS. 7 and 8 show further modified control systems for the apparatus shown in FIG. 1;

FIG. 9 illustrates a safety control arrangement which may be incorporated in any of the systems shown in FIGS. 1, 6, 7 and 8;

FIG. 10 is a schematic diagram of a suitable brake for use in the arresting systems; and FIG. 11 is a schematic view of suitable means for supporting the arresting cable in elevated position across the runway.

Referring to the drawings, which illustrate preferred embodiments of the invention, an aircraft arresting system in accordance with the invention includes a suitable barrier or engaging means shown schematically at 10 in FIGS. 3–5 supported in position by props 11 (FIG. 11) across a runway 12 along which an aircraft 15 passes in the course of takeoff or landing operations. The engaging means 10 is connected at its opposite ends 16 to cables 20 which extend therefrom around pulleys 22 having fixed mountings 23 at opposite sides of runway 12.

To one side of the runway a hydraulic ram device 25 is supported upon mounting blocks 26 (FIG. 1), and this device includes a cylinder member 28, shown as fixed in position by the mountings 26, and a piston member 30 arranged to reciprocate in and out of cylinder 28 and including at its outer end a guide block 32 having guide rollers 33 which roll along guide tracks 34. Guide block 32 includes a mounting for a plurality of sheaves 35, shown for purposes of illustration as four in number, and at the end of cylinder 28 farthest from the piston member 30 three further sheaves 36 are mounted in stationary position. Thus, with the hydraulic ram 25 in its normally extended position the sheaves 35 and 36 are normally separated to the fullest extent.

Cable 20 is reeved about sheaves 35 and 36 alternately in the usual manner and the other end of cable 20 is connected to a drum 40, with the major portion of the length of cable normally being coiled about the drum as shown in FIG. 1 and FIG. 3. Drum 40 is fixed to a rotating shaft 42 which is supported by mounting blocks 43, containing suitable bearings (not shown), at any suitable location adjacent the ram 25. Also carried upon shaft 42 are a number of brakes 45, 45a and 45b which may be any type suitable for arresting rotation of shaft 42 and drum 40.

A preferred brake for this purpose is a disk type brake including a hydraulic operator and coolant passages for the brake through which the hydraulic actuating fluid may pass for the additional purpose of cooling the brake as well as applying the actuating force thereto. Details of such a brake are shown somewhat schematically in FIG. 10, wherein the stator 46 of the brake (anchored against rotation in any suitable manner) includes radial coolant passages 47 and segmental annular coolant passages 47a connecting with further radial coolant passages, so that the coolant passes alternately, radially inwardly and outwardly of the stator. The flow path into and out of the stator will be apparent from FIG. 10.

The brake also includes a rotating disk 44 connected to a carrier 44a which is keyed or otherwise suitably fixed to shaft 42, and on opposite sides of the disk are segments of friction material 44b adapted to press against opposite sides of disk 44 to resist rotation thereof. The clamping force upon the friction material is provided by suitable pistons 49 which are operable under pressure from the coolant liquid. Further details of the brake mechanism per se are believed unnecessary here since they are not necessary to a full understanding of the invention.

It is desirable to provide controls for programming the two energy absorbing mechanisms above described, for the purpose of regulating the amount of energy absorbed and the rate at which energy is absorbed by each of these devices. Thus, for example, for controlling the energy absorbed by ram 25 the hydraulic fluid supply line 48 extending into cylinder member 28 includes a check valve 50 arranged to provide for flow in a direction out of the ram and a bypass line 52 including a manually controlled normally closed valve 53 providing for flow around check valve 50 when resetting the system. Line 48 leads to a fluid reservoir 55 which is totally closed, and within which the pressure is controlled through an air line 56 leading to a suitable supply of pressure air through a manifold 57, a pressure regulator 58, and a normally closed manually operated valve 59. Reverse flow from manifold 57 is prevented by a check valve 59a.

Leading from manifold 57 are control lines 60, 60a and 60b, each containing an appropriate solenoid operated control valve 62, 62a and 62b, and each leading to accumulator tanks 63, 63a and 63b. Operation of valves 62, 62a and 62b is controlled from the respective switches 64, 64a and 64b mounted upon a remote panel board 65. Thus, the atmosphere within reservoir 55 is controlled by opening or closing appropriate one or more of the valves 62, 62a and 62b by closing the appropriate switches 64, 64a or 64b, and as hydraulic fluid passes from the ram through check valve 50 into reservoir 55 the back pressure on this hydraulic fluid will be determined by the number of accumulators 63, 63a or 63b which are connected to manifold 57 through their control valves.

For example, if it is desired to have ram 25 absorb its maximum permissible amount of energy then all of the valves 62, 62a and 62b are closed and the pressure within tank 55 rises more rapidly and to a higher value than if one or more of the accumulators were connected to reservoir 55, providing an effectively greater atmosphere to be compressed by the hydraulic fluid. By appropriately closing one or more of the switches 64, 64a and 64b an operator stationed at the remote control board 65 is thus able to preselect the amount of energy to be absorbed by the hydraulic ram 25.

The pressure in the individual accumulators 63, 63a and 63b may be regulated and replenished at the end of each arresting operation by supplying pressure air from the regulator 58 through a branch line 66 which is connected to the individual accumulators through lines 67, 67a and 67b, each of the latter of which includes a suitable check valve 68, 68a and 68b for preventing reverse flow from the accumulators into line 66. Manually operable bleed valves 69, 69a and 69b are also provided for venting to atmosphere each of the accumulators, individually, in case it is necessary to lower the pressure within any of them for any reason.

The control for the primary energy absorbing apparatus provided by drum 40 and the brakes 45, 45a and 45b includes a closed fluid reservoir 70 which is pressurized from an air tank 72 through a reducing valve 73. A constant supply of pressure air in tank 72 is provided by an air compressor 74 driven by motor 75. Hydraulic fluid in reservoir 70, under pressure from tank 72, is arranged to flow through outlet line 77 to a manifold 78, and from this manifold lead the control lines 80, 81 and 82. Flow through line 80 leads to brake 45 and is controlled by a pivot-operated valve 85 including a pilot operator 86 connected to a pilot pressure line 87. When valve 85 is opened hydraulic fluid under pressure flows to brake 45, actuating that brake and also cooling it, as mentioned above, and this fluid then flows through an outlet line 88 into a sump tank 90. A manually operable restricting valve 92 is included in line 88 for the purpose of providing a back pressure in brake 45 sufficient to actuate the operator piston 49 thereof.

In a similar manner control line 81 includes valve 85a having a pilot operator 86a supplied from a pilot line 87a, and flow through line 81 passes through brake 45a to outlet line 88a through a restricting valve 92a to sump tank 90. The control for the third brake 45b similarly includes the control valve 85b in line 82, its pilot operator 86b, and pilot line 87b. Fluid passed by valve 85b operates and cools brake 45b, passing then to outlet line 88b and through restricting valve 92b to the sump tank.

The pilot pressure for the pilot operators of valves 85, 85a and 85b is supplied by a pump 95 driven through gearing 96 from shaft 42. This pump draws fluid from a tank 97 through an inlet line 98 and supplies fluid under pressure through its outlet line 100 to a transfer gland 102 carried on shaft 42. The outlet line 100 is also connected back to tank 97 through a relief valve 103, the purpose of which will be described subsequently. It will be noted that so long as shaft 42 is not rotating there is no output from pump 95.

Pressure fluid from line 100 passes through a transfer gland 102 to a passage 104 (FIG. 2) within shaft 42, and this passage extends within an appropriate inertia responsive valve member indicated generally at 105, the details of which are shown in FIG. 2. A further passage 106 in shaft 42 is arranged to connect the valve member 105 back to the transfer gland 102 and to an outlet line 107, from whence the controlled fluid passes through a check valve 108 into a control manifold 109. The pilot control lines 87, 87a and 87b are connected to manifold 109 through solenoid operated valves 110, 110a and 110b, and these valves are in turn controlled through switches 112, 112a and 112b on control board 65, as shown in FIG. 1. The supply of pressure fluid to the brake control valves 85 may thus be regulated by the operator from the control board.

Inertia responsive valve 105 is normally open with shaft 42 at rest, but since pump 95 is not operating at this time there is no output pressure in manifold 109. However, when shaft 42 rotates to drive pump 95, and once the valve 105 has opened, fluid under pressure passes through check valve 108 and through those solenoid operated valves 110, 110a and 110b which may have been opened to actuate the corresponding main control valves. This fluid under pressure remains in manifold 109 due to check valve 108 and in this manner the brake control valves are effectively locked in open position once actuated. To reset the brake control valves, an exhaust line 114 having a normally closed manually operated valve 115 therein, is arranged to connect manifold 109 to tank 97, and when reset valve 115 is opened the control fluid under pressure will exhaust from control manifold 109 to provide for reclosing of the brake control valves 85, 85a, or 85b.

Referring to FIG. 2, the inertia responsive valve includes a fly wheel member 118 mounted in freely rotatable fashion upon shaft 42 between thrust bearings 119 and 119a. The former bearing abuts a disk or plate 120 which is fixed to shaft 42 and rotates therewith, and which includes spaced pins 122 extending over the periphery of fly wheel 118. A lug 123 extends from fly wheel 118 between the stops, and adjustable springs 124 extends between the lug and the pins 123. The fly wheel 118 also includes a sleeve portion 125 including a connecting passage 126 which is arranged to connect the passage 103 and 106 within shaft 42 at a given angular position of the fly wheel upon shaft 42, as defined by the biasing force of springs 124. A suitable nut 127 is threaded to shaft 42 and abuts bearing 119a to retain the flywheel in properly aligned position axially of the shaft, and suitable seals 128 are provided on opposite sides of passage 126.

Accordingly, while drum 40 is accelerating the fly wheel 118 lags behind disk 120, with subsequent movement of passage 126 out of the position wherein it connects the passages 102 and 106. As acceleration of drum 40 approaches constant angular velocity fly wheel 118 will advance with respect to shaft 42 under the bias of springs 124 until it returns to the position wherein passages 104 and 106 are connected. At this time control pressure fluid will be passed to manifold 109 to actuate the brakes and apply a decelerating force to drum 40. Regulation of the opening of the inertia responsive valve 105 may be provided by varying the bias force of springs 124 in any suitable manner.

A suitable reset mechanism is provided including a pump 130 driven by motor 131 and drawing from sump tank 90. The output of pump 130 passes through line 132 to a hydraulic motor 133 geared to rotate shaft 42 in a direction to coil the cable 20 upon drum 40. The exhaust line 135 from motor 133 passes through a manually controlled restricting valve 136 and a check valve 137 to the reservoir output line 77, and thus as the cable is rewound upon the drum the hydraulic fluid supply in reservoir 70 is replenished, it being understood that in the meantime all of the control valves 85, 85a and 85b have been closed. At the same time the valve 53 may be opened to supply pressure fluid to ram 25 and expand the ram to its starting condition. The fluid from the ram having passed into reservoir 55 through check valve 50 against the controlled pressure atmosphere, will flow back under the effect of such pressure through bypass line 52 under force sufficient to expand the ram since there is no substantial force pulling upon cable 20 other than its own weight during the resetting of the mechanism.

It will be seen from the above description that an operator stationed at control board 65 may select the rate of energy absorption and the quantity of energy absorbed both in the main or primary system including the drum and brakes 45, 45a and 45b, and also in the secondary system including the ram 25. For example, a trained operator having a chart to which he can refer quickly for information regarding the mass of various types of aircraft, and being able to estimate the velocity of the aircraft to be retarded, can selectively operate the switches 64, 64a and 64b and 112, 112a and 112b to set up the control in accordance with desired initial conditions, and he can if necessary apply additional decelerating force (within the limits of the system), during an arresting operation if such added force is needed.

Thus the present invention provides a versatile energy absorbing apparatus which may be regulated to adapt it to varying conditions as to the type of aircraft and velocity of engagement. The system thus effectively retards the movement of the aircraft without imposing excessive forces of deceleration upon the vehicle. This feature is important in connection with emergency motion retarding apparatus of the type contemplated here, where the aircraft to be engaged may not be constructed with the high forces of deceleration under consideration and thus parts of the aircraft, such as the undercarriage, are not capable of withstanding relatively high retarding forces. In addition to this, the retarding force for certain aircraft, such as large multi-engine craft, will be considerably greater than for small relatively light aircraft, and retarding forces necessary for the former could apply excessive deceleration forces on the latter. With the controls provided by the present invention the energy absorbing mechanism may be quickly adapted to a wide range of types of aircraft and is capable of handling all of them safely and efficiently.

The above described apparatus relies for interaction of the primary and secondary energy absorption devices upon sensing of acceleration conditions of the drum and shaft 42. Depending upon the rate of cable pay-out and the number of accumulators 63, 63a or 63b connected into the ram circuit, it may be possible for the primary energy absorbing action to commence before ram 25 has collapsed completely. It may be desirable to correlate the operation of these two energy absorbing devices in somewhat more definite manner under certain circumstances. For example, it may sometimes be desirable to have the ram complete its stroke, or at least substantially so, before the brakes are applied. Suitable arrangements providing such correlated operation of the primary and secondary energy absorbing mechanisms are shown in FIGS. 6–8.

Referring first to FIG. 6, wherein parts identical to those in FIG. 1 are given the same reference numeral, and wherein similar parts have the same reference numeral with a prime added, the discharge ram 48' from line 25 includes, in addition to check valve 50, a controlling restriction 145, and the pressure differential across this restriction is applied through lines 146 and 147 to opposite sides of a controlling diaphragm 150 which is normally biased by a spring 152 in a direction against pressure fluid from line 146. The pressure differential across the restriction 145 (together with whatever flow resistance may be caused by check valve 50) will act, during collapsing of the ram and consequent induced flow through line 48', to overcome the bias of spring 152.

Diaphragm 150 is connected through a controlling rod 154 or the like to operate a normally open main control valve 155 which is connected to govern the flow through a control line 157 supplying the control pressure manifold 109. Hydraulic fluid under pressure is supplied from pump 95 to control line 157 only when shaft 42 is rotating, and thus when the system is actuated the differential pressure across restriction 145 will operate to close valve 155 until such time as this pressure differential no longer is sufficient to overcome the bias of spring 152. This may be regulated, for example, so that the pressure differential does not approach zero until near the end of the stroke of ram 25, and thus the ram will complete, or substantially complete, its energy absorbing stroke before control pressure is supplied to manifold 109 by opening of valve 155. Then, when valve 155 opens the control pressure will pass through whatever of the pilot control valves 110, 110a, and 110b have been opened by the operator, and the selected brakes 45, 45a or 45b will be applied.

FIG. 7 illustrates schematically another similar control system for correlating the operation of the ram and the drum braking apparatus. Recalling that as the ram collapses the hydraulic fluid expelled therefrom passes into reservoir 55 through check valve 50, and that the reservoir 55 is closed so that the atmosphere therewithin is being compressed by additional hydraulic fluid passing into the reservoir, the back pressure upon the line 48' will increase as a function of the collapsing of ram 25. Pressure from line 48' is supplied through line 160 to a diaphragm operator including a diaphragm 162 and biasing spring 163. The diaphragm is connected through an operating rod 164 or the like to a normally closed valve 165 which replaces the valve 155 in the embodiment shown in FIG. 6. The remainder of the system is the same as that shown in FIG. 6 and operation thereof will be obvious from the above description.

A further control arrangement is shown in FIG. 8 wherein the valve 165 of FIG. 7 is replaced by a normally open valve 170 controlling flow through line 157. In the embodiment shown in FIG. 8 the closing valve 170 is effected by a control arm 172 pivoted at 173 and actuated by the carrier sleeve 174 of a fly ball governor 175. This governor is driven through a pinion 176 which meshes with a rack 178 movable with the piston member 30' of the ram 25. In this control arrangement the operation of governor 175, and consequent initial control movement of sleeve 174 will close valve 170, and when the ram decelerates to a certain value the pilot control valve 170 will be triggered to open and supply pilot pressure to control manifold 109. This in turn will actuate one or more of the brakes 45, 45a and 45b as explained previously.

FIG. 9 shows a modified arrangement in the nature of a safety feature which may be incorporated in any one of the control systems shown in FIGS. 1, 6, 7, or 8. This feature insures that control pressure fluid is supplied to the brake actuating valve operators at some predetermined collapsed or partially collapsed position of the ram 25 regardless of whether the main control valve has been actuated. In FIG. 9 the valve 180 is the equivalent of any one of the control valves 105, 155, 165 or 170 referred to above. This valve controls the flow of pressure fluid through the line 182 for supply to the control manifold 109. A normally closed solenoid operated valve 185 is connected in a line 186, which bypasses valve 180, and the solenoid 187 is wired for operation by a limit switch 188 mounted on the cylinder member of ram 25 and operable by an arm 189 carried on the piston member of the ram. The mountings of either switch 188 or arm 189 may be varied in any convenient manner to provide for actuation of switch 188 at some time during the collapsing stroke of ram 25, for example at the end of its operating stroke. This will cause valve 185 to open and supply pressure control fluid to the brake valve operators in the event that valve 180 has not functioned for some reason.

Further control arrangements for correlating the operation of the two energy absorbing mechanisms may be provided in accordance with the invention, and the above described embodiments are included here merely for purposes of illustration, to show that various types of controls may be applied in accordance with the invention. All of the above described systems, however, include primary and secondary energy absorbing mechanisms, the secondary mechanism being operable during at least a portion of the time of acceleration of the primary mechanism. Thus the secondary energy absorbing mechanism in all cases acts to absorb a predetermined amount of the initial force of acceleration of the force imposed upon the system. This in turn acts to prevent high acceleration forces from snapping the retarding cable and putting the entire system out of commission. Further, as outlined above, the preselection of the rate and quantity of energy absorbing action by each of the primary and secondary mechanisms provides a system which is versatile in application and efficient and safe in operation. It is contemplated that a reset mechanism such, for example, as described in connection with FIG. 1, will be provided in all cases to assure quick restoration of the system to a ready position, whereby subsequent engagements can be accomplished in relatively rapid sequence.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for arresting the motion of aircraft moving along a surface, comprising a cable extending across said surface, means providing for engagement of the aircraft with said cable, primary energy absorbing means attached to the ends of said cable for exerting a decelerating force upon the aircraft through said cable, primary a control apparatus connected to regulate the decelerating force exerted upon said cable by said primary energy absorbing means, means defining a normally enlarged loop in said cable, secondary energy absorbing means cooperating with said loop defining means providing for controlled contraction of said loop upon engagement of said cable with the aircraft to reduce the acceleration forces transmitted to said primary energy absorbing means upon engagement between said cable and the aircraft, secondary control apparatus connected to regulate the force exerted by said second energy absorbing means upon said loop defining means to control the force transmitted therethrough to said primary energy absorbing means, and selectively operable control means connected to said primary control apparatus and to said secondary control apparatus for correlating the operation thereof.

2. Apparatus for applying a braking action to a vehicle moving along a surface, comprising barrier means for engaging the moving vehicle, means supporting said barrier means across the path of the moving vehicle providing for engagement of the vehicle by said barrier means with resultant movement of said barrier means along with the vehicle, flexible cable means attached to said barrier means and extending from opposite ends thereof, drum means supported in stationary position with respect to said barrier means and having the ends of said cable means secured thereto, the major portion of said cable means normally being coiled about said drum, a plurality of sheaves, a hydraulic ram having first and second parts arranged for relative movement, means supporting at least one of said sheaves on the first part of said ram and another of said sheaves on the second part of said ram, portions of said cable means between said drum means and said barrier means being reeved about said sheaves, a supply source of hydraulic fluid connected for normally maintaining said parts of said ram in a relatively separated condition, means for resisting reverse flow from said ram toward said supply source to provide for controlled collapse of said ram under a force from said cable means for absorbing some energy during acceleration of said cable means by engagement between the vehicle and said barrier means, the ratio of said sheaves being such that a portion of the force applied to said cable is transmitted to said drum means for uncoiling said cable means therefrom, and brake means connected to said drum means for resisting uncoiling rotation thereof to apply a primary decelerating force through said cable means and said barrier means to the vehicle.

3. Apparatus for applying an energy braking action to a vehicle moving along a defined path, comprising barrier means for engaging the moving vehicle, means supporting said barrier means across the path of the moving vehicle providing for engagement of the vehicle by said barrier means with resultant movement of said barrier means along with the vehicle, flexible cable means attached to said barrier means and extending from opposite ends thereof, drum means supported in stationary position with respect to said barrier means and having the ends of said cable means secured thereto, the major portion of said cable means normally being coiled about said drum means, a plurality of sheaves, a hydraulic ram having first and second parts arranged for relative movement, means supporting at least one of said sheaves on the first part of said ram and another of said sheaves on the second part of said ram, portions of said cable means between said drum means and said barrier means being reeved about said sheaves, a supply source of hydraulic fluid connected for normally maintaining said parts of said ram in a relatively separated condition, means for resisting reverse flow from said ram toward said supply source to provide for controlled collapse of said ram under a force from said cable means for absorbing some of the energy during acceleration of said cable means by engagement between the vehicle and said barrier means, the ratio of said sheaves being such that a portion of the force applied to said cable is transmitted to said drum means for uncoiling said cable means therefrom, brake means connected to said drum means for resisting uncoiling rotation thereof to apply a primary decelerating force through said cable means and said barrier means to a vehicle, and selectively operable control means operatively connected to said brake means for applying said brake means at a rate predetermined from the mass of the vehicle and the approximate velocity of the vehicle at the time of engagement between the vehicle and said barrier means.

4. Apparatus for applying a preselected retarding force to a vehicle moving along a defined path comprising, means for engaging the moving vehicle, means supporting said engaging means across the path of the moving vehicle providing for engagement thereof by the vehicle with resultant movement of said engaging means along with the vehicle, flexible cable means attached to said engaging means and extending from opposite ends thereof, drum means having the ends of said cable means secured thereto and normally having the major portion of said cable means coiled thereabout, a plurality of sheaves, a hydraulic ram having first and second parts arranged for relative movement, means supporting at least one of said sheaves on each of the first and second parts of said ram for relative movement thereof, said ram normally supporting said sheaves in widely spaced relation, portions of said cable means between said drum means and said engaging means being threaded about said sheaves, a supply of pressure fluid normally maintaining said parts of said ram in a relatively widely separated condition, means connected to conduct said pressure fluid from said ram upon exertion of a collapsing force thereon from said cable means through said sheaves in response to engagement of a vehicle by said engaging means, means controlling the flow of fluid in said conducting means to regulate the absorption of energy by said ram, the ratio of said sheaves being such that a portion of the energy applied to said cable means is transmitted to said drum means for uncoiling said cable means therefrom, and braking means connected to said drum means for resisting rotation thereof in an uncoiling direction to apply a primary decelerating force through said cable means to the engaged vehicle.

5. Apparatus for applying a preselected retarding force to a vehicle moving along a defined path comprising, means for engaging the moving vehicle, means supporting said engaging means across the path of the moving vehicle providing for engagement thereof by the vehicle with resultant movement of said engaging means along with the vehicle, flexible cable means attached to said engaging means and extending from opposite ends thereof, drum means having the ends of said cable means secured thereto and normally having the major portion of said cable means coiled thereabout, a plurality of sheaves, a hydraulic ram having first and second parts arranged for relative movement, means supporting at least one of said sheaves on each of the first and second parts of said ram for relative movement thereof, said ram normally supporting said sheaves in widely spaced relation, portions of said cable means between said drum means and said engaging means being threaded about said sheaves, a supply of pressure fluid normally maintaining said parts of said ram in a relatively widely separated condition, means conducting said pressure fluid from said ram upon exertion of a collapsing force thereon from said cable means through said sheaves in response to engagement of a vehicle by said engaging means, means controlling the flow of fluid in said conducting means to regulate the absorption of energy by said ram, the ratio of said sheaves being such that a portion of the energy applied to said cable means is transmitted to said drum means for uncoiling said cable means therefrom, braking means connected to said drum means for resisting rotation thereof in an uncoiling direction to apply a primary decelerating force through said cable means to the engaged vehicle, and selectively operable control means operative on said brake means actuated in accordance with predetermined conditions relating to mass of the vehicle and approximate velocity thereof at the time of engagement to control the energy absorbed by said brake means.

6. Energy absorbing apparatus of the character described comprising a cable extending across a surface along which vehicles to be retarded will pass for engagement thereof by the vehicle, drum means having an end of said cable secured thereto, the major portion of said cable normally being coiled about said drum means, brake means connected to said drum means for resisting uncoiling rotation thereof to apply a decelerating force through said cable to the vehicle, said brake means including fluid cooling means for said brake means during energization thereof, and control means arranged to apply said brake means at a predetermined rate and simultaneously to supply coolant fluid to said cooling means.

References Cited in the file of this patent

UNITED STATES PATENTS

| | | |
|---|---|---|
| 1,488,572 | Vroom | Apr. 1, 1924 |
| 2,783,004 | Fieux | Feb. 26, 1957 |
| 2,789,780 | Cotton et al. | Apr. 23, 1957 |
| 2,843,228 | Wysor | July 15, 1958 |

FOREIGN PATENTS

| | | |
|---|---|---|
| 642,705 | Great Britain | Sept. 13, 1950 |
| 663,710 | Great Britain | Dec. 27, 1951 |